United States Patent [19]

Tanaka et al.

[11] Patent Number: 5,609,790
[45] Date of Patent: Mar. 11, 1997

[54] LIQUID CRYSTAL COMPOSITIONS

[75] Inventors: Takashi Tanaka; Yuzuru Sato, both of Suwa; Hiroshi Iwane; Shiro Inui, both of Inashiki-gun, all of Japan

[73] Assignee: Seiko Epson Corporation, Tokyo, Japan

[21] Appl. No.: 457,741

[22] Filed: Jun. 1, 1995

Related U.S. Application Data

[63] Continuation of Ser. No. 129,063, filed as PCT/JP93/00127, Feb. 3, 1993, abandoned.

[30] Foreign Application Priority Data

Feb. 4, 1992 [JP] Japan .................................. 4-047849

[51] Int. Cl.$^6$ .......................... C09K 19/34; C09K 19/52; C09K 19/12
[52] U.S. Cl. ................................ 252/299.61; 252/299.01; 252/299.64; 252/299.65; 252/299.66; 252/299.67
[58] Field of Search ........................ 252/299.01, 299.61, 252/299.64, 299.65, 299.66, 299.67

[56] References Cited

U.S. PATENT DOCUMENTS

| | | | |
|---|---|---|---|
| 5,108,650 | 4/1992 | Koden et al. | 252/299.01 |
| 5,110,496 | 5/1992 | Mogamiya et al. | 252/299.61 |
| 5,364,560 | 11/1994 | Mizukami et al. | 252/299.65 |

FOREIGN PATENT DOCUMENTS

| | | |
|---|---|---|
| 450595 | 10/1991 | European Pat. Off. . |
| 1-213390 | 8/1989 | Japan . |
| 3-223390 | 10/1991 | Japan . |
| 3-291270 | 12/1991 | Japan . |
| 4-46158 | 2/1992 | Japan . |
| 4-82862 | 3/1992 | Japan . |
| 4-103560 | 4/1992 | Japan . |
| 4-108764 | 4/1992 | Japan . |
| 4-261162 | 9/1992 | Japan . |
| 4-266855 | 9/1992 | Japan . |

OTHER PUBLICATIONS

S. Inui et al., "First Order Paraelectric–antiferroelectric Phase Transition in a Chiral Smectic Liquid Crystal of a Fluorine Containing Phenyl Pyrimidine Derivative", *Japanese Journal of Applied Physics*, Part 2, 29, 6, 1990, pp. L987–L990.

M. Johno et al., "Temporal and Spatial Behavior of the Field–induced Transition Between Antiferroelectric and Ferroelectric Phases in Chiral Smectics", *Japanese Journal of Applied Physics*, Part 2, 29, 1, 1990 pp. L107–L110.

A. D. L. Chandani et al., "Novel Phases Exhibiting Tristable Switching", *Japanese Journal of Applied Physics*, Part 2, 28, 6, 1989, pp. L1261–L1264.

A. D. L. Chandani et al., "Antiferroelectric Chiral Smectic Phases Responsible for the Tristable Switching in MHPOBC", *Japanese Journal of Applied Physics*, 28, No. 7, Jul. 1989, pp. L–1265–L1268.

A. Ikeda et al., "Influence of the Optical Purity on the Smectic Layer Thickness and the Transition Order in Enantiomeric Mixtures of an Antiferroelectric Liquid Crystal", *Japanese Journal of Applied Physics*, Part 2, 30, 6A, 1991, pp. L1032–L1035.

K. Itoh et al., "Self–recovery from Alignment Damage under AC Fields in Anti–ferroelectric and ferroelectric Liquid Crystal Cells", *Japanese Journal of Applied Physics*, Part 1, 30, 4, 1991, pp. 735–740.

Y. Yamada et al., "Ferroelectric Liquid Crystal Display Using Tristable Switching", *Japanese Journal of Applied Physics*, Part 1, 29, 9, 1990, pp. 1757–1764.

A. D. L. Chandani et al., "Tristable Switching in Surface Stabilized Ferroelectric Liquid Crystals with a Large Spontaneous Polarization", *Japanese Journal of Applied Physics*, vol. 27, No. 5, May, 1988, pp. L729–L732.

*Primary Examiner*—Shean C. Wu
*Attorney, Agent, or Firm*—Oliff & Berridge

[57] ABSTRACT

A liquid crystal composition which shows an antiferroelectric smectic phase in a wide temperature range including room temperatures, and allows high speed operation at a low voltage. A liquid crystal composition comprising at least one kind of compound expressed as $$R_1-(X_1)_k-A_1-(X_2)_m-A_2-(X_3)_n-\underset{Z}{C^*H}-R_2$$

shows an antiferroelectric smectic liquid crystalline phase at room temperatures. In the above-mentioned formula, both $R_1$ and $R_2$ are alkyl groups, $X_1$ is a bonding group, $X_2$ and $X_3$ are independently selected bonding groups, k, m and n are independently selected from 0 or the integer 1, Z is $CF_3$ or $CH_3$, $A_1$ and $A_2$ are groups independently selected from a six-membered ring optionally replaced with 0 to 2 nitrogen atoms, or a group in which 2 to 3 such six-membered rings of the same kind or different kinds are linked at the para positions directly or via one or more bonding groups, wherein one or more hydrogen atoms in one or more such rings is optionally replaced with either fluorine atom, methyl group or ethyl group.

4 Claims, 4 Drawing Sheets

LIQUID CRYSTAL COMPOSITIONS

This is a continuation of application Ser. No. 08/129,063 filed Nov. 12, 1993, now abandoned, which is a national stage of PCT/JP93/00127, filed Feb. 3, 1993.

TECHNICAL FIELD

This invention relates to liquid crystal compositions used for a display device and a light valve and the like, and more particularly, to novel liquid crystal compositions having improved electrooptical characteristics.

BACKGROUND ART

Tristable switching in antiferroelectric liquid crystals has been actively investigated because it is expected to be one of the ways to solve some of the essential problems found with conventional surface stabilized ferroelectric liquid crystals (SSFLC). (See A. D. L. Chandani et al.: Jpn. J. Appl. Phys., 27, L729 (1988), A. D. L. Chandani et al.: Jpn. J. Appl. Phys., 28, L1265 (1989) etc.)

Figure 4:
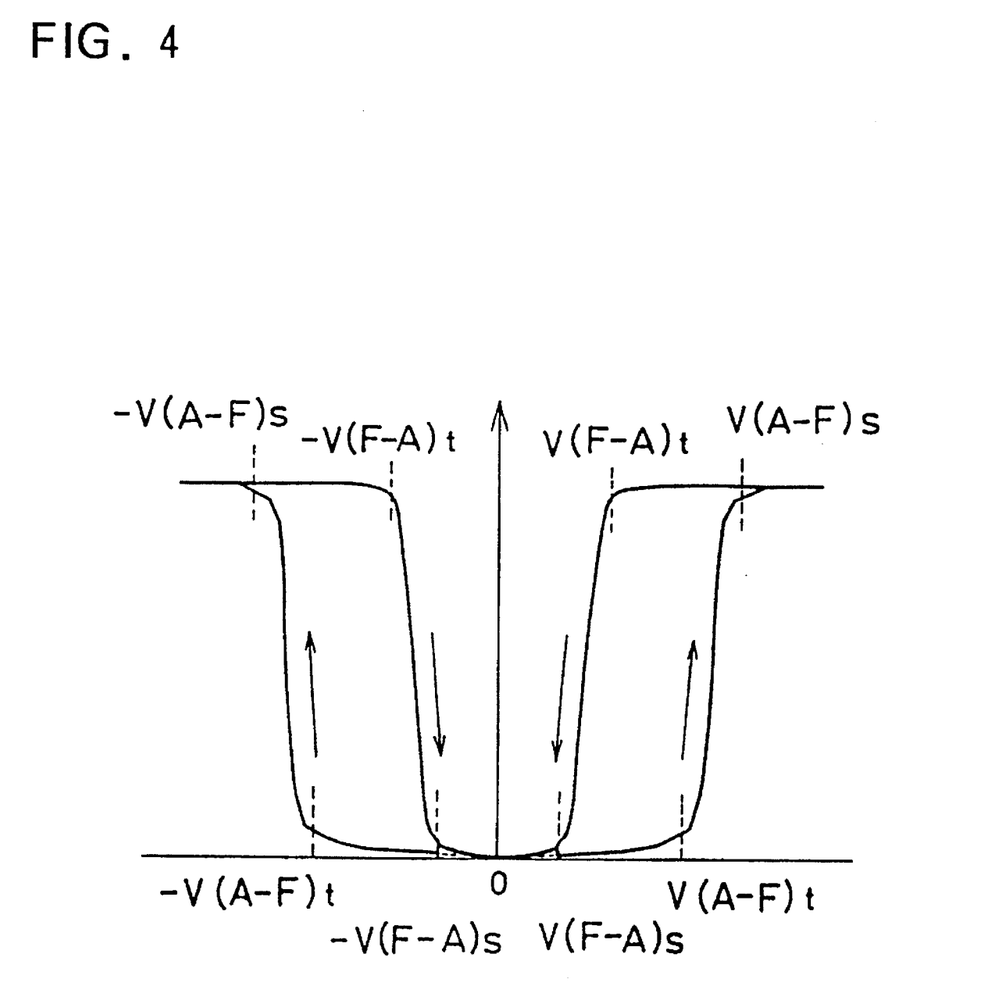
FIG. 4 is a graph illustrating electrooptical characteristics of a device used in embodiments according to the present invention.

The main features of the above mentioned tristable switching include:

(1) The antiferroelectric-ferroelectric phase transition caused by application of an electric voltage, as shown in FIG. 4, has sharp threshold characteristics to a dc voltage. In FIG. 4, the horizontal axis shows the applied voltage and the vertical axis shows the optical transmittance.

(2) As the antiferroelectric-ferroelectric phase transition shows a wide optical hysteresis as shown in FIG. 4, when the antiferroelectric phase or the ferroelectric phase is selected, the selected state can be maintained by applying a biased voltage.

(3) Two states in ferroelectric phase induced by an electric field become optically equivalent.

(4) As the localization of electric impurities in the liquid crystal can be prevented, electrooptical characteristics show no such degeneration with time that is shown with SSFLC.

By the use of these characteristics, time-shared multiplex driving of a simple matrix can be carried out without any duty ratio limitation.

Figure 3A:
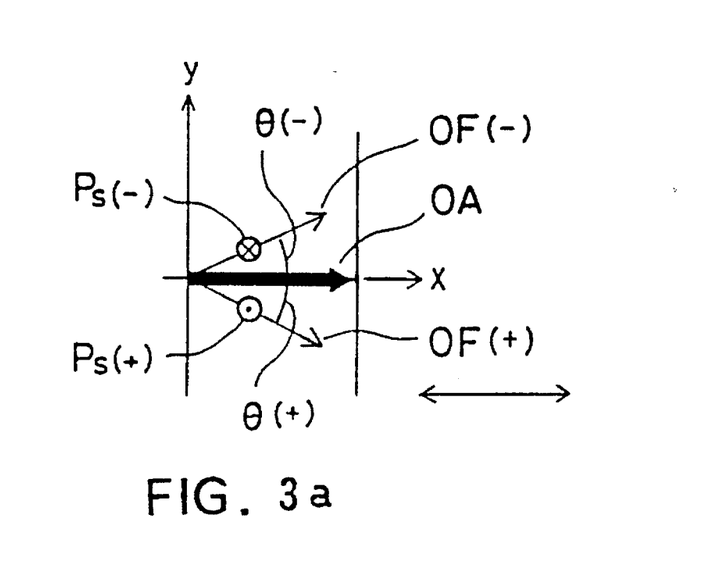
FIGS. 3A and 3B are schematic views illustrating a device used in embodiments according to the present invention.
Figure 3B:
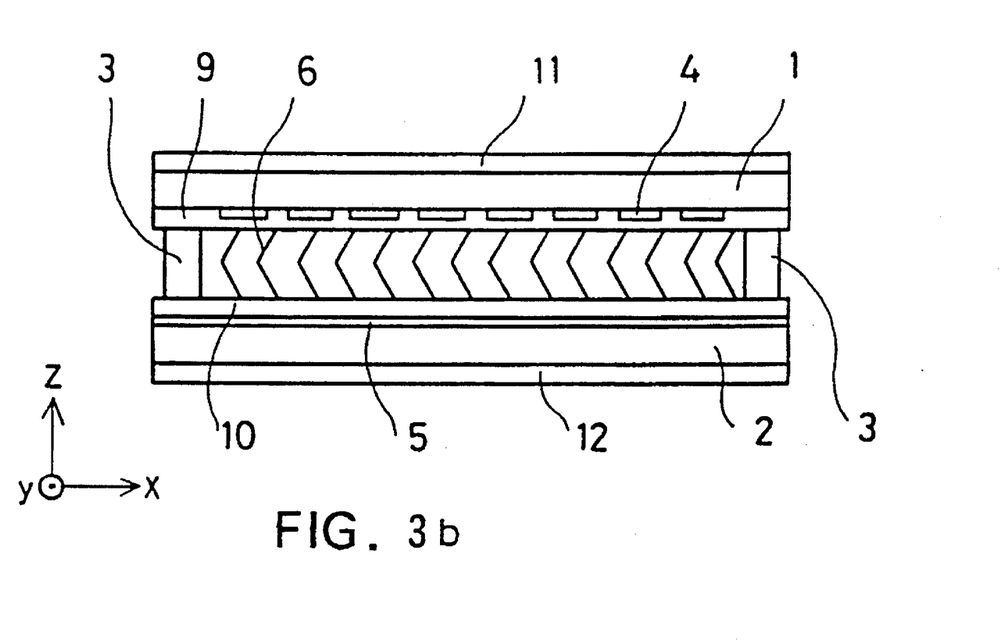

The display principle using an antiferroelectric liquid crystal will be explained by the reference to FIGS. 3A and 3B. As shown in FIG. 3A, the optical axis OA in the antiferroelectric phase is along the smectic layer normal. As shown in FIG. 3B, when a cell comprising a liquid crystal layer 6 maintained between two glass substrates 1 and 2 having transparent electrodes 4, 5 and alignment layer 9, 10, is so positioned between crossed polarizing plates 11, 12 that the optical axis OA was set parallel to either of the polarization axes, the device comes under light shielding condition (tentatively designated as OFF). The numeric character 3 in FIG. 3 indicates a spacer material.

Under this condition, as shown by the hysteresis in FIG. 4, applying a pulsed voltage whose absolute value is equal to or less than |V(A−F)t| causes little change in the optical transmittance and the OFF state can be maintained. On the other hand, when a pulsed voltage whose absolute value is equal to or more than |V(A−F)s| is applied, transition occurs as shown in FIG. 3A, according to the polarity of the pulse, into a ferroelectric phase (+) having optical axis OF(+) and spontaneous polarization $P_S$(+), and a ferroelectric phase (−) having optical axis OF(−) and spontaneous polarization $P_S$(−). As the optical axis makes an angle $\Theta$ (+) or $\Theta$ (−) with the polarization axis, the device comes under light transmitting condition (tentatively designated as ON). As the angles $\Theta$ (+) and $\theta$ (−) are equal, both phases can be treated as optically equivalent. A liquid crystalline phase showing such character has first been found in 4-(1-methylheptyl oxycarbonyl)phenyl 4′octyloxybiphenyl-4-carboxylate (MHPOBC), and called antiferroelectric chiral smectic C phase ($S_{CA}^*$ phase). Examples of already reported compounds and liquid crystal compositions include those shown in Japanese Patent Laid-Open Publication No. 1-213390.

However, the above mentioned prior art technique has two problems to be solved, described as follows.

One is the problem regarding the stability of the antiferroelectric phase state. Generally, it is said to have sharp threshold characteristics to a direct current voltage, and in the multiplex driving, when the antiferroelectric phase state is once selected, the antiferroelectric phase state can be maintained even if a biased voltage of one polarity is applied. However, it is known that even when an electric field that has its absolute value of equal to or less than the threshold voltage (equal to or less than |V(A−F)t| in FIG. 4) is applied to the antiferroelectric phase state, an apparent tilt angle is changed responsive to the field intensity and affects the optical transmittance. (M. Johno et al.: Jpn. J. Appl. Phys. 29 L107 (1990)). This phenomenon is called pretransitional effect in the antiferroelectric ferroelectric phase transition, and lowers the contrast ratio of the device, and is not desirable from the application point of view.

Another problem is that the relaxation speed from the ferroelectric state to the antiferroelectric state is slower than the response speed of the reversed switching, and that the relaxation speed shows temperature dependence. The slow relaxation time leads to the slow response speed in terms of the electric features of the liquid crystal display device and becomes the cause of flickering in the screen. According to the prior art technique, the scanning frequency must be set low to respond to the response characteristics of the liquid crystalline material to be used, that led to a problem that the screen cannot be scrolled smoothly, or the pointing device cannot be moved smoothly.

The present invention solves the above-described problems, and provides liquid crystal compositions and electrooptical devices having high stability and excellent electrooptical characteristics.

SUMMARY OF THE INVENTION

Liquid crystal compositions according to the present invention have the following construction.

That is (1) according to one aspect of the present invention, there is provided a liquid crystal composition comprising at least one kind of compound expressed as and which shows an antiferroelectric smectic liquid crystalline phase at room temperature.

Here, in the above-mentioned formula, $R_1$ is an alkyl group of 1–30C, $R_2$ is an alkyl group of 2–20C, $X_1$ is a bonding group selected from —O—, —OCO—, —COO—, —OCO$_2$— and —CO—, $X_2$ and $X_3$ are bonding groups independently selected from —OCO—, —COO—, —CH$_2$O— and —OCH$_2$—, k, m and n are independently selected from 0 or the integer 1, Z is CF$_3$ or CH$_3$, $A_1$ and $A_2$ are groups independently selected from a six-membered ring with ring atoms replaced with 0 to 2 nitrogen atoms wherein the remainder of the ring atoms are carbon atoms, or a group in which 2–3 such six-membered rings of the same kind or different kinds are linked at the para positions directly or via one or more bonding groups selected from —COO—, —OCO—, —CH$_2$O— or —OCH$_2$—, wherein one or more hydrogen atoms in one or more such rings is optionally replaced with fluorine atom, methyl group, or ethyl group. C* shows an asymmetric carbon atom.

In the liquid crystal composition shown as the above mentioned formula, $X_1$, $X_2$ and $X_3$ are respectively bonding groups and they exist when k, m and n are the integer 1, but they do not exist when k, m and n are 0, and the neighboring groups are linked directly. $A_1$ and $A_2$ can be groups of either the same kind or different kinds; when no carbon atom of the six-membered ring is replaced with a nitrogen atom, they are benzene rings, and in a case where two carbon atoms are replaced with two nitrogen atoms, they are, for example, pyrimidine rings. Two or three such six-membered rings which are optionally substituted with one or two nitrogen atoms, and the remainder of the ring atoms are carbon atoms, can be linked at the para positions, and as for linkage, the rings can be either directly linked or linked via one or more bonding groups. Some examples of $A_1$ and $A_2$ include:

but of course $A_1$ and $A_2$ are not limited to these groups.

(2) According to another aspect of the present invention, there is provided a liquid crystal composition in which the above mentioned liquid crystal composition (1) is mixed with a liquid crystal compound showing a ferroelectric smectic phase having a spontaneous polarization of equal to or more than 100 nC/cm² near a lower limit temperature of a ferroelectric liquid crystalline phase. The amount to be mixed is preferably about 0.1 to about 30% by weight.

Examples of the liquid crystal to be mixed include, in addition to the compound 10 which will be shown later in embodiments:

The liquid crystal compound to be mixed is not limited to these compounds.

(3) According to still another aspect of the present invention, there is provided a liquid crystal composition in which the above mentioned liquid crystal composition (1) is mixed with a compound which shows a nematic phase and/or a smectic phase by itself and contains two aromatic rings in the structural formula. Examples of a compound containing two aromatic rings include:

(wherein R and R' are independently selected from an alkyl group or an alkoxy group of a linear or a branched structure having about 2 to 20 carbons, and a hexagon having H inside designates a cyclohexane ring). However, many liquid crystal compounds can be derived from these basic structures by introducing various bonding groups and substituents; thus the compounds which can be applied to the present invention are not limited to the above mentioned examples.

(4) According to yet another aspect of the present invention, the phase transition sequence, in order of decreasing temperature, comprises isotropic phase-smectic A phase-antiferroelectric smectic phase or isotropic phase-smectic A phase-chiral smectic C phase-antiferroelectric smectic phase.

By the use of the compound of the above mentioned general formula as a main component, a practical temperature range can be assured for $S_{CA}^*$ phase, and such a phase transition sequence that is necessary for good orientation of liquid crystal molecules can be realized. The compound having the spontaneous polarization of equal to or more than 100 $nC/cm^2$ near the lower limit temperature of the ferroelectric liquid crystal phase decreases the threshold voltage of the composition and inhibits the pretransitional effect. The compound having two aromatic rings in the structural formula has a function that decreases the viscosity of the composition, and it is an effective component to shorten the relaxation time from the ferroelectric phase to the antiferroelectric phase.

By arranging the phase transition sequences of the liquid crystal composition in order of decreasing temperature as isotropic phase-smectic A phase-antiferroelectric smectic phase, or isotropic phase-smectic A phase-chiral smectic C phase-antiferroelectric smectic phase, in a process to infuse the liquid crystal composition in the isotropic phase into a device followed by cooling, the liquid crystal molecules are uniaxially oriented when the smectic A phase appears, and the layer direction can be maintained after the phase transition to the phase below the smectic A phase. Accordingly, uniformly oriented antiferroelectric smectic phase having the optical axis aligned in one direction can be obtained.

DETAILED DESCRIPTION OF PREFERRED EMBODIMENTS

The present invention will be explained in detail with reference to the following embodiments. The sample used was produced by infusing under heating the liquid crystal compositions of the present embodiment in a cell having a 1.7 to 2.0 μm gap in which polyimide alignment layers are formed on transparent electrodes and rubbed uniaxially, followed by gradually cooling and retaining the ambient temperature in a temperature range for the antiferroelectric chiral smectic C phase ($S_{CA}^*$ phase). The structure of the device is shown in FIG. 3B.

Figure 1:
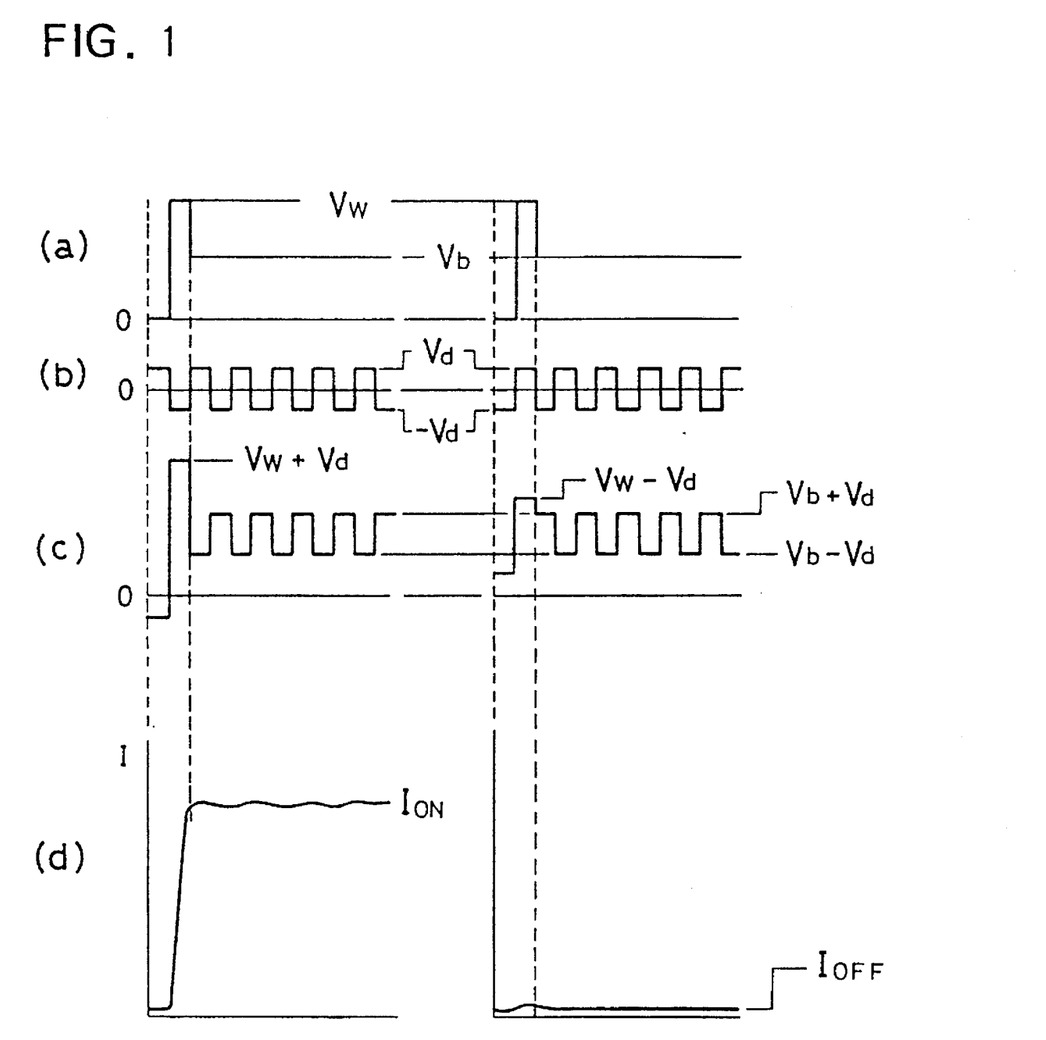
FIG. 1 is a diagram of driving voltage wave forms used for evaluation of embodiments according to the present invention.
Figure 2:
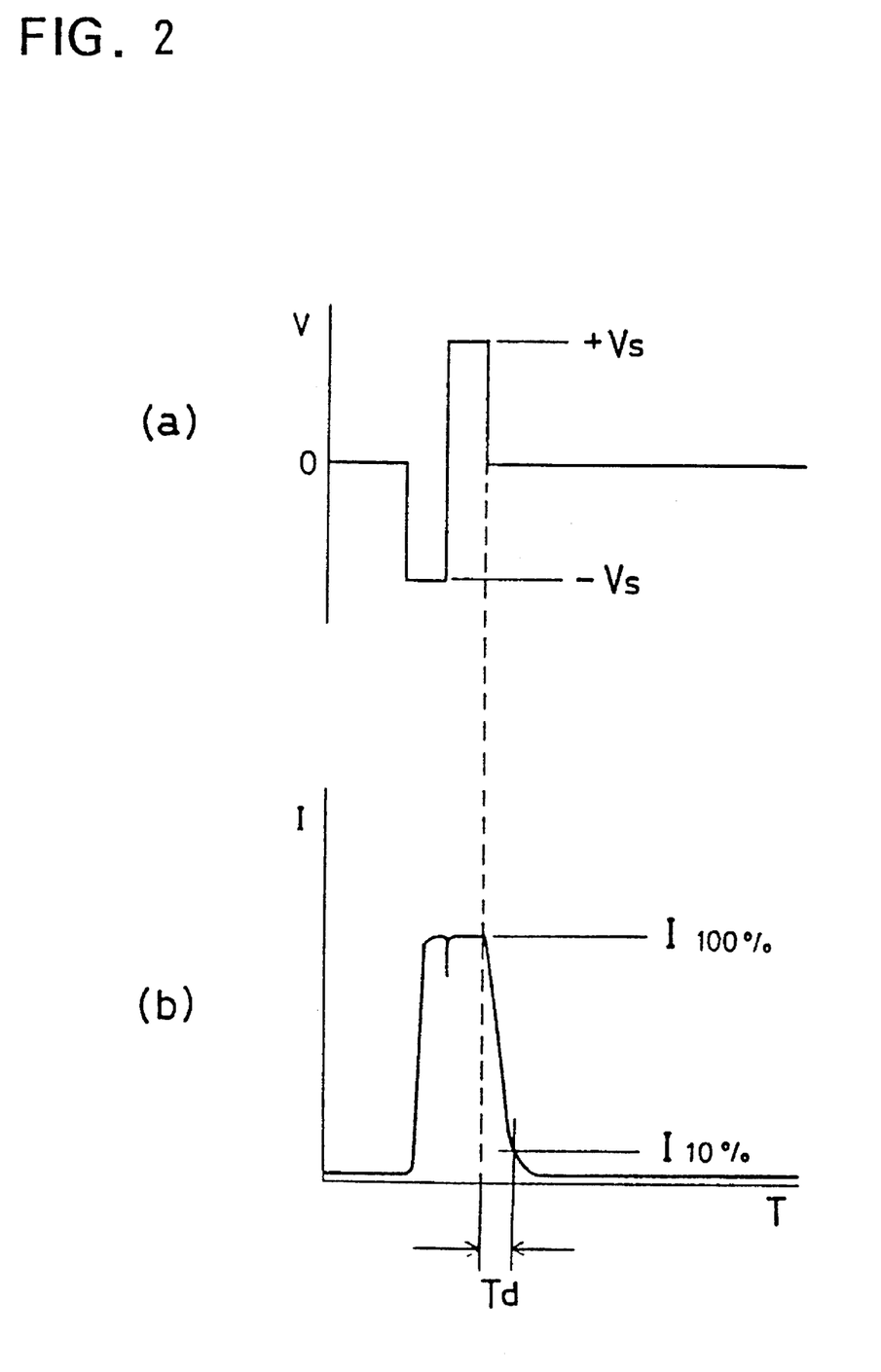
FIG. 2 is a diagram of a driving voltage wave form used for evaluation of embodiments according to the present invention.

In order to evaluate the electrooptical characteristics of the device at multiplex driving, the driving wave forms shown in FIG. 1 were applied to the device and the contrast ratio $I_{ON}/I_{OFF}$ was measured when each voltage level $V_w$, $V_b$ and $V_d$ and the pulse width were optimized. FIG. 1(a) shows the voltage wave form to be applied to scanning electrodes, FIG. 1(b) shows the voltage wave form to be applied to signal electrodes, FIG. 1(c) shows the voltage wave form to be applied to a pixel, and FIG. 1(d) shows the transmittance change of the pixel, (the horizontal axis shows time). As the relaxation time from the ferroelectric phase to the antiferroelectric phase, the value expressed as $T_d$ in FIG. 2(b) was measured after applying a voltage of $\pm V_s$ which is equal to or more than the saturation level, then setting the electric field to 0 level as shown in FIG. 2(a).

EXAMPLE 1

A liquid crystal composition was obtained according to the following composition in percent by weight.

A compound expressed as

(hereinafter referred to as "Compound 6") 30

A compound expressed as (hereinafter referred to as "Compound 7") 20

A compound expressed as (hereinafter referred to as "Compound 8") 50

The phase transition points with decreasing temperature were I (77.1) $S_A$ (59.3) $S_{CA}^*$. The figures in the parentheses designate the phase transition points (°C), I stands for the isotropic phase, $S_A$ stands for the smectic A phase, and $S_{CA}^*$ stands for the antiferroelectric chiral smectic C phase. Paraelectric phase-antiferroelectric phase transition point $T_C$ is 59.3° C.

The expression of I ( ) Sa ( )$S_{CA}^*$ shows that the phase transition sequence comprises isotropic phase (I)-smectic A phase ($S_A$)-antiferroelectric chiral smectic C phase ($S_{CA}^*$). $S_{CA}^*$ phase is one form of chiral smectic C phase ($S_C^*$) and under normal conditions, the dipole moments cancel out within two adjacent layers to provide antiferroelectricity; however, when electric field over the saturation level is applied, spontaneous polarization is induced to show ferroelectricity. The ferroelectric state caused by applying the electric field is equal to the ordinary ferroelectric chiral smectic C phase ($S_C^*$). In some cases, the chiral smectic C phase shows only ferroelectricity in its high temperature region and shows antiferroelectricity in its low temperature region (as an example, the above mentioned MHPOBC can be shown as a known substance). In such a case, the phase transition sequence becomes isotropic phase-smectic A phase-chiral smectic C phase ($S_C^*$)- antiferroelectric chiral smectic C phase ($S_{CA}^*$); however, the $S_C^*$-$S_{CA}^*$ transition is often unable to be identified by ordinary microscopic observation. The compositions in embodiments of the present invention may have these two kinds of phase series.

When the device was operated by the driving wave forms of FIG. 1 at 30° C. (reduced temperature $T_C$–30° C.=29.3° C.), $I_{ON}/I_{OFF}$ of 15 was obtained at $V_w$=22 v, $V_d$=3 v, $V_b$=13 v and the pulse width of 100 μs. The response relaxation time $T_d$ was 2.2 ms, and the apparent tilt angle θ was 35°. Since the transmittance of the device I depends on the apparent tilt angle θ, according to the formula

$I = I_0 \sin^2(2\theta)\sin^2(\pi\Delta nd/\lambda)$ a bigger value of θ which is equal to or below 45° shows that the display device has higher light utilization efficiency.

EXAMPLE 2

A liquid crystal composition was obtained according to the following composition in percent by weight.

Compound 6 90
A compound expressed as (hereinafter referred to as "Compound 9") 5
A compound expressed as (hereinafter referred to as "Compound 10") 5

Compound 9 is a compound which shows a nematic phase and Compound 10 is a compound which shows a smectic phase, and the spontaneous polarization $P_S$ of Compound 10 is 240 nC/cm². The phase transition temperatures with decreasing temperature were I(72.4)$S_A$ (62.9) $S_{CA}^*$. When the device was operated by the driving wave forms shown in FIG. 1 at 30° C. ($T_C$–30° C.=32.9° C.), $I_{ON}/I_{OFF}$ of 23 was obtained at $V_W$=18 v, $V_d$=3 v, $V_b$=10 v and the pulse width of 150 μs. The response relaxation time $T_d$ was 1.8 ms and the apparent tilt angle θ was 31°.

EXAMPLE 3

A liquid crystal composition was obtained according to the following composition in percent by weight.

| | |
|---|---|
| Compound 6 | 70 |
| Compound 8 | 10 |
| A compound expressed as | |

![structure](C10H21O-[ring]-[ring]-COO-[ring(CH3)]-COOCHC6H13 with CF3)

| | |
|---|---|
| | 10 |
| Compound 9 | 5 |
| Compound 10 | 5 |

The phase transition temperatures with decreasing temperature were I (72.3) $S_A$ (58.9) $S_{CA}^*$. When the device was operated by the driving wave forms shown in FIG. 1 at 30° C. ($T_C$–30° C. =28.9° C.), $I_{ON}/I_{OFF}$ of 20 was obtained at $V_W$=17 v, $V_d$=2 v, $V_b$=10 v and the pulse width of 150 μs. The response relaxation time $T_d$ was 1.2 ms.

EXAMPLE 4

A liquid crystal composition was obtained according to the following composition in percent by weight.

| | |
|---|---|
| Compound 6 | 40 |
| Compound 7 | 26 |
| Compound 8 | 13 |

A compound expressed as

Compound 10

The phase transition temperatures in decreasing temperature were I (68.4) $S_A$ (55.8) $S_{CA}*$. When the device was operated by the driving wave forms shown in FIG. 1 at 30° C. (TC–30° C.=25.8° C.) $I_{ON}/I_{OFF}$ of 20 was obtained at $V_W$=22 v, $V_d$=3 v, $V_b$=14 v and the pulse width of 120 μs. The response relaxation time $T_d$ was 1.7 ms and the apparent tilt angle θ was 32°.

Industrial Applicability

According to the present invention, there are provided liquid crystal compositions having phase transition sequences that allow good orientation and showing a stable antiferroelectric smectic phase in a wide temperature range including room temperatures. Since the electrooptical characteristics are improved, the resulting display device shows high contrast ratio and allows high speed scanning. The present invention can be applied for high definition liquid crystal display devices, light valves and spatial light modulators and the like.

We claim:

1. A liquid crystal composition which shows an antiferroelectric smectic liquid crystalline phase at room temperatures, wherein said composition comprises a mixture of:

-continued and

2. A liquid crystal composition which shows an antiferroelectric smectic liquid crystalline phase at room temperatures, wherein said composition comprises first compounds of the formulae:

and further comprising a second liquid crystal compound of the formula:

3. A liquid crystal composition which shows an antiferroelectric smectic liquid crystalline phase at room temperatures, wherein said composition comprises a first compound of the formula:

further comprising a second liquid crystal compound of the formula:

and further comprising a third liquid crystal compound of the formula:

4. A liquid crystal composition which shows an antiferroelectric smectic liquid crystalline phase at room temperatures, wherein said composition comprises first compounds of the formulae:

-continued
and further comprising a second liquid crystal compound of the formula:

and further comprising a third liquid crystal compound of the formula:

* * * * *